June 21, 1955 W. P. MASON 2,711,515

DELAY LINE

Filed Sept. 29, 1950 2 Sheets-Sheet 1

INVENTOR
W. P. MASON
BY
Ralph P. Holcomb
ATTORNEY

June 21, 1955 W. P. MASON 2,711,515

DELAY LINE

Filed Sept. 29, 1950 2 Sheets-Sheet 2

INVENTOR
W. P. MASON
BY
Ralph T. Holcomb
ATTORNEY

United States Patent Office 2,711,515

Patented June 21, 1955

2,711,515

DELAY LINE

Warren P. Mason, West Orange, N. J., assignor to Bell Telephone Laboratories, Incorporated, New York, N. Y., a corporation of New York Application September 29, 1950, Serial No. 187,419

6 Claims. (Cl. 333—30)

This invention relates to wave transmission and more particularly to delay lines.

The principal object of the invention is to delay the transmission of a signal for a predetermined time. Another object is to prevent the distortion of a delayed signal. A further object is to reduce the loss associated with the delaying of a signal. Other objects are to increase the efficiency, reduce the cost, and improve the transmission characteristics of delay lines, and to provide a delay line with a large number of pick-off points.

Delay lines, which are four-terminal networks for delaying the transmission of, or storing, a signal as it passes therethrough, are increasing in importance as components of wave transmission systems. For example, they have found application as storage devices in switching systems and in computers and are useful as balancing devices to eliminate reflections in radar systems and in long-distance telephone lines.

A common form of delay line, especially for longer delays, consists of a bar of elastic material which acts as a mechanical transmission line with electromechanical transducers at each end. Quartz crystals have been used for these transducers, but the insertion loss of a delay line so constructed is undesirably high due to the fact that quartz has an electromechanical coupling factor of only ten per cent.

The delay lines of the present invention are of this general type, but their transmission characteristics are improved and the cost reduced by utilizing the electrostrictive effect in a fused ceramic body comprising polarized polycrystalline barium titanate ($BaTiO_3$). The term electrostrictive effect refers to the property of a body which causes a change in its dimensions proportional to the square of the electric displacement upon the application of an electric field. A change in the dimension parallel to the field is called the longitudinal effect, and a change in the dimensions perpendicular thereto is called the transverse effect. These dimensional changes are only partially reversed when the field is removed. However, when barium titanate is used, a permanent polarization can be induced in the ceramic if it is placed in a direct-current field for a short time. This polarized ceramic will reverse its dimensional change upon the application of a field in the opposite direction. The electrostrictive properties of polarized barium-titanate ceramic are discussed at some length in applicant's paper in Bell Laboratories Record, vol. XXVII, No. 8, August 1949, pages 285 to 289, to which reference is made for additional data. Advantages of this material are that it is easy to work, may be molded into any desired form, may be polarized in any desired direction, has a large electromechanical coupling factor, and is quite stable in its properties at ordinary temperatures.

When barium-titanate ceramic is used in delay lines, it is desirable that its polarization be permanent so that no direct-current biasing voltage will be required. If a sufficiently high direct-current voltage is used for polarization, a considerable remanent polarization will remain when the voltage is removed. This remanent polarization is quite stable with time but can be made permanent by adding from three to five per cent by weight of lead titanate ($PbTiO_3$) to the composition of the ceramic.

By way of example only, several delay lines embodying the invention are disclosed herein. One comprises a transversely polarized ceramic slab of fused polycrystalline barium titanate with input electrodes oppositely disposed on its major faces at one end, output electrodes on the same faces at the other end, and a grounded shield between. The electrodes are perpendicular to the direction of the polarization. When an alternating signal voltage is applied to the input electrodes, the electrostrictive property of the slab produces in the slab a longitudinal compressional wave which travels to the output electrodes where a corresponding output voltage appears after a delay determined by the length of the bar. Thus, the ends of the slab itself, in cooperation with the associated electrodes, serve as driving and pick-up elements, and no separate electromechanical transducers are required.

Intermediate delays may be obtained by providing additional pairs of transverse pick-off electrodes oppositely disposed on the major faces of the slab at longitudinally spaced intervals. If an undistorted wave shape is desired at each pick-off point, it has been found, however, that there are two conflicting requirements which cannot be met in a single slab. One is that the thickness of the slab in the direction of polarization should not exceed a half wavelength at the mean operating frequency, in order to prevent undue fringing of the applied electric field. The other is that this width should be at least ten wavelengths, in order to keep the compressional wave sufficiently plane as it is propagated down the slab. Both of these requirements are met in an embodiment comprising at least twenty slabs, each not more than a half wavelength in thickness and each having the same number of similarly spaced pairs of electrodes. These slabs are placed side by side with their major faces adjoining and are preferably fused into a composite structure by means of glass or some other suitable type of binder to form a single unit which is longitudinally sectionalized. The sections may be alternately poled and the electrodes at each pick-off point connected in parallel. The driving element for this device may conveniently be a plate of barium-titanate ceramic polarized in the thickness direction and provided on its major faces with electrodes to which the signal is applied. Of course, some other suitable type of electromechanical transducer may be used if desired for the driving element. In order to prevent undesired reflections at the end there is provided an energy absorbing termination comprising a transversely polarized bar of barium titanate with a plurality of pairs of transverse pick-off electrodes oppositely disposed on its sides. Each pair of electrodes is connected through a resistance approximately equal to the reactance of the interelectrode capacitance at the mean frequency to be transmitted.

Another embodiment of the delay line, utilizing a plane shear wave, comprises a longitudinally polarized rectangular bar of barium titanate with a pair of input electrodes oppositely disposed on opposite sides at one end of the bar and one or more pairs of transverse pick-off electrodes oppositely disposed at longitudinally spaced intervals on the same sides. The end portion of the bar, provided with a sufficient number of pairs of oppositely disposed transverse electrodes connected through properly chosen resistances, constitutes a termination.

In still another embodiment a delay line with multiple pick-off points is provided by inserting a number of sections of fused quartz between electromechanical transducers which may comprise plates of barium titanate polarized in the thickness direction and provided with suitable electrodes. The end transducer, which is the driving element, sets up a longitudinal compressional wave when a signal voltage is applied to its electrodes. The other pairs of electrodes provide the pick-off points. A termination in the form of a transversely polarized bar of barium titanate with associated electrodes and resistors may be secured to the end of the delay line.

As mentioned above, the remanent polarization in any of the ceramic elements herein described may be made permanent by adding from three to five per cent of lead titanate to the barium titanate. The mixture is then molded to the desired shape and fixed in a ceramic kiln to produce a solid body. The electrodes may, for example, be provided by applying a coating of silver paste and firing.

The nature of the invention will be more fully understood from the following detailed description and by reference to the accompanying drawings, of which:

Figures 4, 5:
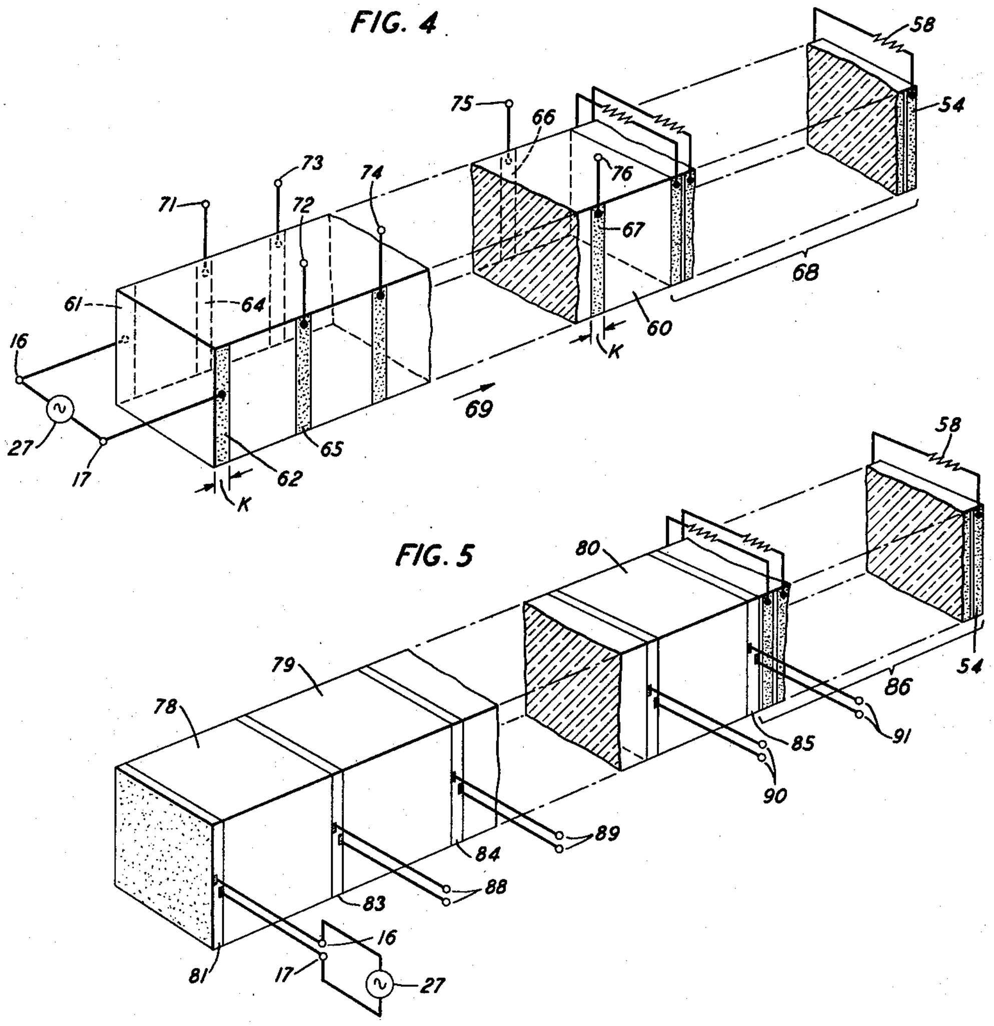

Fig. 4 is a perspective view of another delay line in accordance with the invention utilizing a plane shear wave and comprising a longitudinally polarized solid bar of barium titanate with a pair of transverse input electrodes at one end on opposite sides, pairs of pick-off electrodes at spaced intervals on the same sides, and a termination; and Fig. 5 is a perspective view of still another delay line in accordance with the invention comprising a number of sections of fused quartz inserted between electromechanical transducers and provided with a termination.

Figure 1:
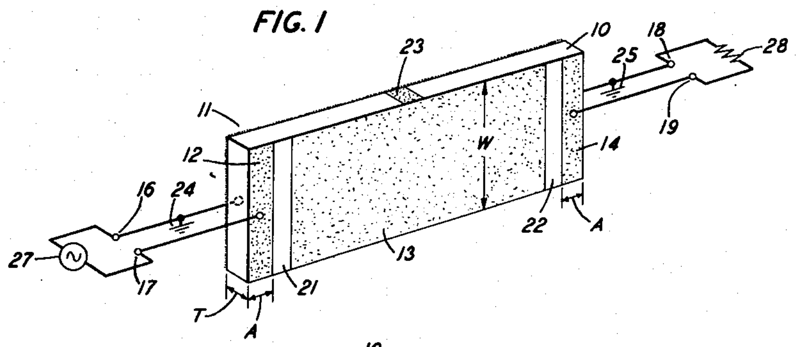
Fig. 1 is a perspective view of a delay line comprising a single slab of transversely polarized barium titanate.

Taking up the figures in greater detail, Fig. 1 shows a delay line comprising a transversely polarized ceramic slab 10 composed principally of fused polycrystalline barium titanate, a back electrode 11 entirely covering one major face, a front electrode divided into three parts 12, 13, and 14, a pair of input terminals 16, 17, and a pair of output terminals 18, 19. The slab 10 preferably has a width W equal to ten or more wavelengths λ at the mean frequency $f$ to be transmitted and, if transmission is to be limited to a single wave, a thickness T of not more than λ2.

The electrodes may be formed by applying silver paste to the two major surfaces of the slab 10 and subjecting it to a baking process. The dividing lines 21 and 22 between the front electrodes 12, 13, and 14 may be formed by a sandblasting or abrasion process. Each of the front electrodes 12 and 14 at the ends of the slab 10 has a width A approximately equal to λ/2 in the direction of propagation. The front electrode 13, extending substantially all the way between the electrodes 12 and 14, is connected to the back electrode 11 by a strap 23 to provide electrostatic shielding for this portion of the slab 10.

The portions of the slab 10 under the electrodes 12 and 14 are transversely polarized by connecting these electrodes together and applying between them and the back electrode 11 a direct-current voltage of the order of 5 to 30 kilovolts per centimeter of the thickness T. When the voltage is removed, there will remain in the ends of the slab 10 a substantial remanent polarization which lasts for a considerable time. In order to make this remanent polarization permanent, between three and five percent of lead titanate may be added to the barium titanate used for the ceramic slab 10. In this case, the slab 10 may be polarized by placing it in a bath of silicon oil, heating it to approximately 130 degrees centigrade, applying the voltage to the electrodes, and cooling under the applied field.

The input terminal 17 is connected to the input electrode 12, and the output electrode 19 is connected to the output electrode 14. The other two terminals 16 and 18 are connected to the back electrode 11, which is grounded as shown at the points 24 and 25. A signal source of alternating electromotive force 27 is shown connected to the input terminals 16, 17, and a load 28 of suitable impedance is connected to the output terminals 18, 19.

When polarized in the manner described, each end of the slab 10, by virtue of the transverse electrostrictive effect, acts as an electromechanical transducer in much the same way as a piezoelectric crystal. An alternating electric signal wave applied to the electrodes 11, 12 produces a longitudinal compressional wave which travels along the slab 10 to the other end thereof and is there reconverted into a corresponding electric wave, which appears at the output terminals 18, 19. The delay introduced depends upon the length of the slab 10 and its velocity of propagation, which is approximately 5,000 meters per second. The delayed signal may, for example, be rectified and used to control the trigger of some device such as a radar pulsing circuit.

In the unterminated delay line shown in Fig. 1 the acoustic wave will be reflected back and forth between the ends of the slab 10 until it dies out due to dissipation in the material. If only the first pulse is to be utilized, there is no objection to these reflections, but if the device is to be used for storing a series of pulses and reproducing them at a later time, the reflected pulses are objectionable. They may be eliminated by providing a termination for the line such, for example, as is described below in connection with Fig. 2.

Figures 2, 3:
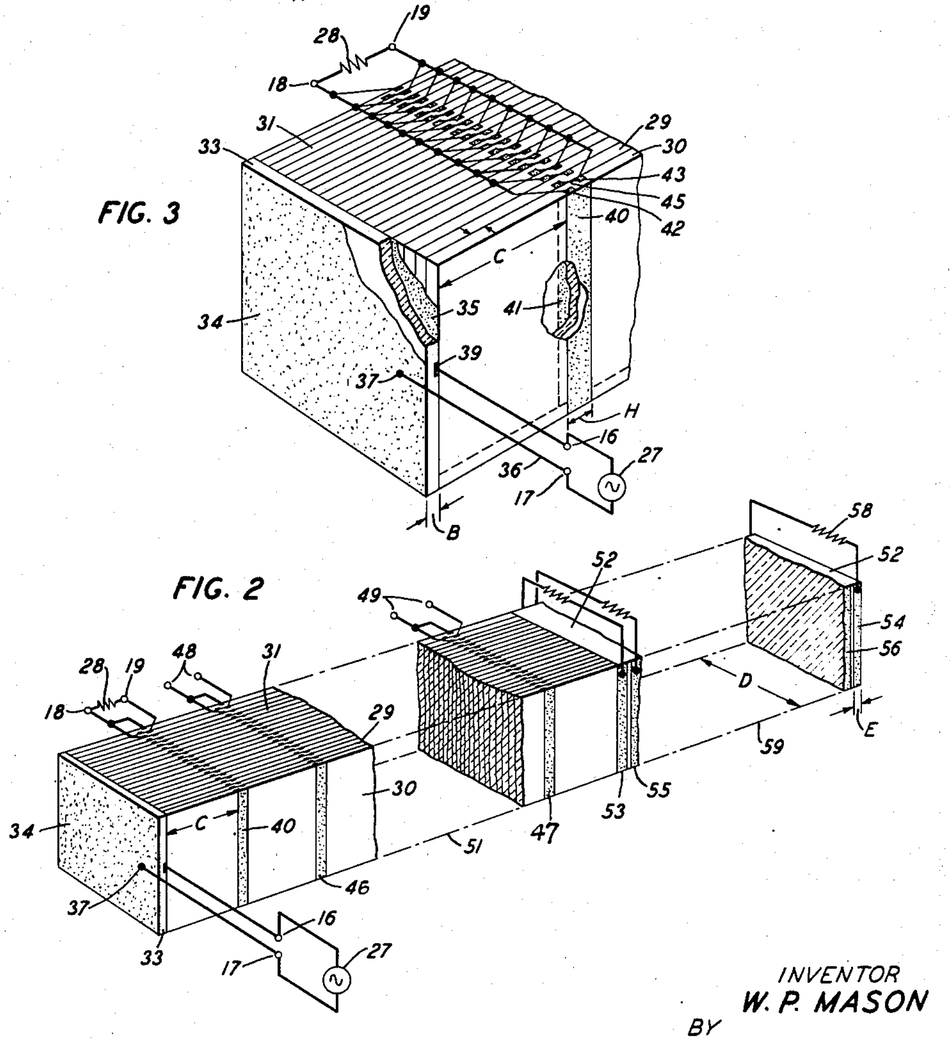
Fig. 2 is a perspective view of an embodiment of the invention comprising a plurality of slabs of the type shown in Fig. 1 fused into a longitudinally sectionalized composite bar and provided with multiple pick-off points and a termination to suppress end reflections.
Fig. 3 is an enlarged fragmentary view, partly cut away, of the input end of the delay line shown in Fig. 2.

In order to maintain a plane compressional wave in the delay line, and thus prevent distortion, the minimum transverse dimension of the acoustic medium should be at least 10λ. In Fig. 1 the slab 10 has a width W of 10λ or more, but, for the reason given, its thickness T preferably does not exceed λ/2. As shown in Fig. 2 and in the enlarged cut-away fragmentary view of Fig. 3 the dimension in the direction T may be increased to the desired value by placing side by side, with their major faces adjoining, twenty or more slabs such as 29 and 30, each having a thickness of approximately λ/2 and a width of at least 10λ. The slabs, which preferably have the same composition as the slab 10, may be fused into a longitudinally sectionalized composite bar 31, for example, by means of glass having a low melting point.

As shown in Fig. 3, the input electromechanical transducer comprises a plate 33 with electrodes 34 and 35 on the major faces. The input terminal 17 is connected to the outer electrode 34 by means of a wire 36 soldered to the electrode, as shown at 37. The other input terminal 16 is connected to the inner electrode 35 through a tab 39 which is an extension of the electrode. The plate 33, which has a thickness B approximately equal to λ/2, is of the same composition as the slab 10 and is polarized in the direction of its thickness in the same manner as the slab 10, is soldered to the end of the composite bar 31. When an alternating signal voltage from the source 27 is impressed upon the electrodes 34, 35, it is converted through electrostrictive action in the plate 33 into a plane compressional wave which is impressed upon the left-hand end of the composite bar 31 and travels to the right. Due to its higher electromechanical coupling factor, of the order of fifty per cent, the transducer 33—34—35 has a considerably higher efficiency of conversion from electrical to mechanical energy than is obtainable with a quartz plate.

The longitudinal compressional wave travelling down the bar 31 is picked off at suitable points, after the desired delay, by means of pairs of electrodes associated with each of the slabs such as 29 and 30. Thus, the slab 30 has a transverse front electrode 40, of width H preferably somewhat less than λ/2, placed at a distance C from the left end, and an oppositely disposed back electrode 41. A tab 42 is brought out from the front electrode 40 and a tab 43 from the back electrode 41 to facilitate wiring. The slabs are transversely polarized under the electrodes in the manner described above. In the arrangement shown in detail in Fig. 3 the slabs are so poled and the electrodes are so connected that all of the generated voltages are in parallel to provide the output voltage at this point. Every alternate slab is poled in one direction and the remaining slabs in the opposite direction. Thus, the slab 30 may be poled from front to back and the slab 29 from back to front, as indicated by the arrows on their top surfaces. The front electrodes of alternate slabs and the back electrodes of the other slabs are connected to one output terminal 18, and the remaining electrodes are connected to the other output terminal 19. Adjacent electrodes may be connected by straps such as 45 between their tabs. An alternative way of holding the slabs together is to flow solder between adjacent electrodes. If this method is used, however, the slabs must be polarized after the solder is applied, to prevent the heat from the solder from depoling the slabs.

As shown in Fig. 2 at the points 46 and 47, other similar sets of electrodes may be placed at spaced intervals along the bar 31 to obtain two or more different delay times from the same delay line. These other output voltages are available at the pairs of terminals 48 and 49. The dot-and-dash lines such as 51 indicate that the composite bar 31 may be extended to any required length and provided with additional sets of pick-off electrodes, if desired.

If the delay line is to be used, for example, for balancing purposes, it is desirable to have no reflections from the end of the bar 31 opposite its input end. One way of accomplishing this is to provide an energy absorbing termination, as shown in Fig. 2. The termination comprises a solid bar 52, made of the same material as the slab 10, having a number of adjacent pairs of transverse electrodes oppositely disposed on its front and back faces. The bar 52 has transverse dimensions corresponding to those of the composite bar 31 and may be secured to the end thereof by soldering. The bar 52 is polarized in the direction of one of its transverse dimensions D, and the electrodes are perpendicular to the polarization. Two front electrodes 53, 54 and parts of two other front electrodes 55, 56 are shown. Each electrode has a width E somewhat less than $\lambda/2$. Corresponding to each front electrode such as 54 there is an oppositely disposed back electrode, not shown. Each pair of electrodes is connected through a resistance such as 58 in which the electrical energy generated by the compressional wave in the portion of the bar 52 under the pair is dissipated. The resistance 58 preferably has a value approximately equal in magnitude to the reactance of the capacitance between the associated electrodes at the frequency $f$. Any required number of pairs of electrodes, with associated resistances, may be placed upon the bar 52 between the electrodes 55 and 56, as indicated by the dot-and-dash lines such as 59. For example, approximately 200 pairs will provide an attenuation of 32 decibels for a longitudinal compressional wave reflected from the right-hand end of the bar 52. Such a structure will provide more complete suppression of reflections than is obtainable with a termination composed of lead-tin-bismuth eutectic, which will give a maximum attenuation of only about 20 decibels.

Fig. 4 shows another embodiment of the delay line in accordance with the invention which may be used in applications where some distortion of the delayed acoustic wave is permissible, as, for example, when only one set of delayed signal pulses is required for a triggering circuit. The delay line comprises a solid rectangular bar 60, a pair of transverse input electrodes 61, 62 oppositely disposed on opposite sides at one end of the bar, one or more pairs of transverse pick-off electrodes 64, 65 and 66, 67 oppositely disposed at longitudinally spaced intervals on the same sides, and a termination 68 at the other end. The bar 60 is made of the same material as the slab 10 and is longitudinally polarized, in the manner described above, in the direction of the arrow 69. Each of the electrodes has a width K preferably somewhat less than $\lambda/2$. The termination 68 has the same construction as the termination shown in Fig. 2, except that the former is polarized longitudinally in the direction of the arrow 69 instead of transversely.

When a signal from the source 27 is impressed upon the input electrodes 61, 62, electrostrictive action in the portion of the bar 60 between these electrodes produces a shearing motion which sets up a plane shear wave in the bar. After a certain delay time this wave reaches the portion of the bar 60 between the first pick-off electrodes 64, 65 where it is reconverted into an output voltage appearing at the terminals 71, 72, to which a suitable load, not shown, may be connected. In like manner output voltages with different delay times may be taken off at the terminals 73, 74 and 75, 76.

Fig. 5 shows another delay line in accordance with the invention, especially useful where distortion of the delayed signal is to be kept at a minimum. The line comprises a number of sections 78, 79, 80 of fused quartz, an input electromechanical transducer 81 at one end, a number of pick-off electromechanical transducers 83, 84, 85, and a termination 86 at the other end. Each of the transducers 81, 83, 84, and 85 may be a polarized ceramic plate with electrodes on its major faces, similar in all respects to the plate 33 shown in Figs. 2 and 3. Alternatively, these transducers may be quartz plates provided with suitable electrodes. The termination, which is secured to the last plate 85, may be of the same construction as the termination shown in Fig. 2. The plates, the sections of quartz, and the termination 86 are all fastened together, as by soldering, to form a composite structure.

When a signal voltage from the source 27 is impressed upon the electrodes of the input transducer 81, a longitudinal compressional wave is set up in the delay line. After a certain delay time this wave reaches the first pick-off transducer 83 where it is reconverted into an electrical signal appearing at the output terminals 88, to which a suitable load, not shown, may be connected. Similarly, electrical output signals with additional delays may be taken off at other pairs of pick-off terminals such as 89, 90, and 91.

What is claimed is:

1. A delay line comprising a plurality of ceramic slabs joined at their major faces to form a longitudinally sectionalized composite bar and means for impressing longitudinal compressional vibrations upon one end of said bar, each of said slabs being composed principally of barium titanate, having a pair of transverse pick-off electrodes oppositely disposed on its major faces, and being tarnsversely polarized between said electrodes.

2. A delay line in accordance with claim 1 in which each of said slabs is unidirectionally polarized between said electrodes.

3. A delay line in accordance with claim 1 in which each of said slabs has a second pair of transverse pick-off electrodes oppositely disposed on said faces and longitudinally spaced from said first-mentioned electrodes, each of said slabs being transversely polarized between said second pair of electrodes.

4. A delay line in accordance with claim 1 in which adjacent slabs are polarized in opposite directions.

5. A delay line in accordance with claim 1 in which the transverse dimension of each of said slabs in the direction of polarization is not greater than a half wavelength at the mean frequency to be transmitted and the other transverse dimension of each of said slabs is equal to at least ten wavelengths at said frequency.

6. A delay line in accordance with claim 1 in which the minimum cross-sectional dimension of said bar is equal to at least ten wavelengths at the mean frequency to be transmitted and the dimension of each of said slabs in the direction of polarization is not greater than a half wavelength at said frequency.

References Cited in the file of this patent

UNITED STATES PATENTS

| | | |
|---|---|---|
| 1,955,471 | Pooler | Apr. 17, 1934 |
| 2,240,293 | Goddard | Apr. 29, 1941 |
| 2,276,013 | Bohannon | Mar. 10, 1942 |
| 2,345,491 | Mason | Mar. 28, 1944 |
| 2,361,998 | Fleming Williams | Nov. 7, 1944 |
| 2,505,515 | Arenberg | Apr. 25, 1950 |
| 2,512,130 | Arenberg | June 20, 1950 |
| 2,538,554 | Cherry, Jr. | Jan. 16, 1951 |
| 2,540,412 | Adler | Feb. 6, 1951 |
| 2,590,405 | Hansell | Mar. 25, 1952 |